US008970491B2

(12) United States Patent
Morita et al.

(10) Patent No.: US 8,970,491 B2
(45) Date of Patent: Mar. 3, 2015

(54) COMPUTER SYSTEM, COMPUTER SYSTEM CONTROL METHOD, PROGRAM, AND INFORMATION STORAGE MEDIUM

(75) Inventors: Toru Morita, Tokyo (JP); Takuya Kawasaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 184 days.

(21) Appl. No.: 13/230,992

(22) Filed: Sep. 13, 2011

(65) Prior Publication Data
US 2012/0068924 A1 Mar. 22, 2012

(30) Foreign Application Priority Data

Sep. 17, 2010 (JP) ................................. 2010-209778

(51) Int. Cl.
G06F 3/033 (2013.01)
G09G 5/08 (2006.01)
G06F 3/0346 (2013.01)
A63F 13/219 (2014.01)
G06F 3/038 (2013.01)
G06F 9/44 (2006.01)

(52) U.S. Cl.
CPC .............. G06F 3/0346 (2013.01); *A63F 13/04* (2013.01); *G06F 9/4443* (2013.01); G06F 3/038 (2013.01); *A63F 2300/1087* (2013.01); *A63F 2300/308* (2013.01)
USPC ............................. 345/157; 345/161; 345/158

(58) Field of Classification Search
None
See application file for complete search history.

(56) References Cited

U.S. PATENT DOCUMENTS

| 8,032,705 | B2 | 10/2011 | Klitsner | |
|---|---|---|---|---|
| 2006/0223635 | A1* | 10/2006 | Rosenberg | 463/37 |
| 2006/0287110 | A1 | 12/2006 | Klitsner | |
| 2008/0080789 | A1* | 4/2008 | Marks et al. | 382/296 |
| 2009/0027337 | A1* | 1/2009 | Hildreth | 345/158 |

FOREIGN PATENT DOCUMENTS

| JP | 2004-258837 A | 9/2004 |
|---|---|---|
| JP | 2007-061489 A | 3/2007 |
| JP | 2008-540033 A | 11/2008 |

OTHER PUBLICATIONS

Office Action for corresponding JP Patent Application No. 2010-209778, dated Oct. 9, 2012.

* cited by examiner

*Primary Examiner* — Alexander Eisen
*Assistant Examiner* — Nan-Ying Yang
(74) *Attorney, Agent, or Firm* — Matthew B. Dernier, Esq.; Gibson & Dernier LLP

(57) ABSTRACT

To prevent a user from sensing change in feeling of operation of a pointing device. There is provided a computer system control method for controlling a computer system having a coordinate designation system for producing base data for calculating position coordinates, the method comprising the steps of obtaining the position coordinates calculated based on the base data; when a predetermined application program is activated from another application program, obtaining position coordinates notified by the other application program, and showing a designated position image on a display screen based on the position coordinates obtained; and when the predetermined application program is activated from an operating system, showing the designated position image on the display screen based on the position coordinates obtained at the step of obtaining the position coordinates.

5 Claims, 7 Drawing Sheets

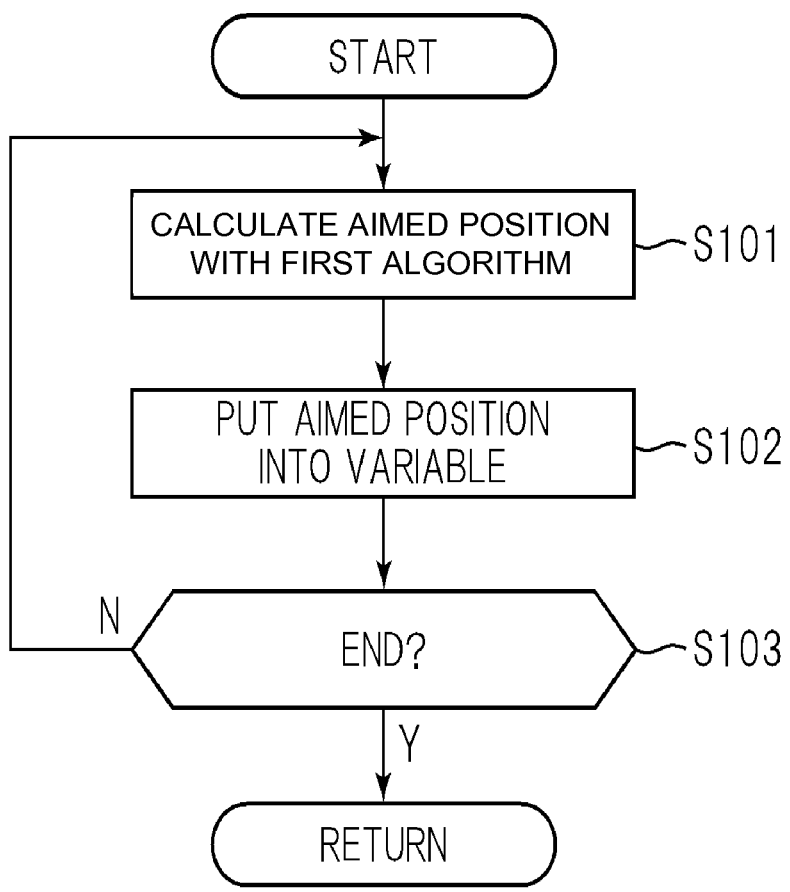

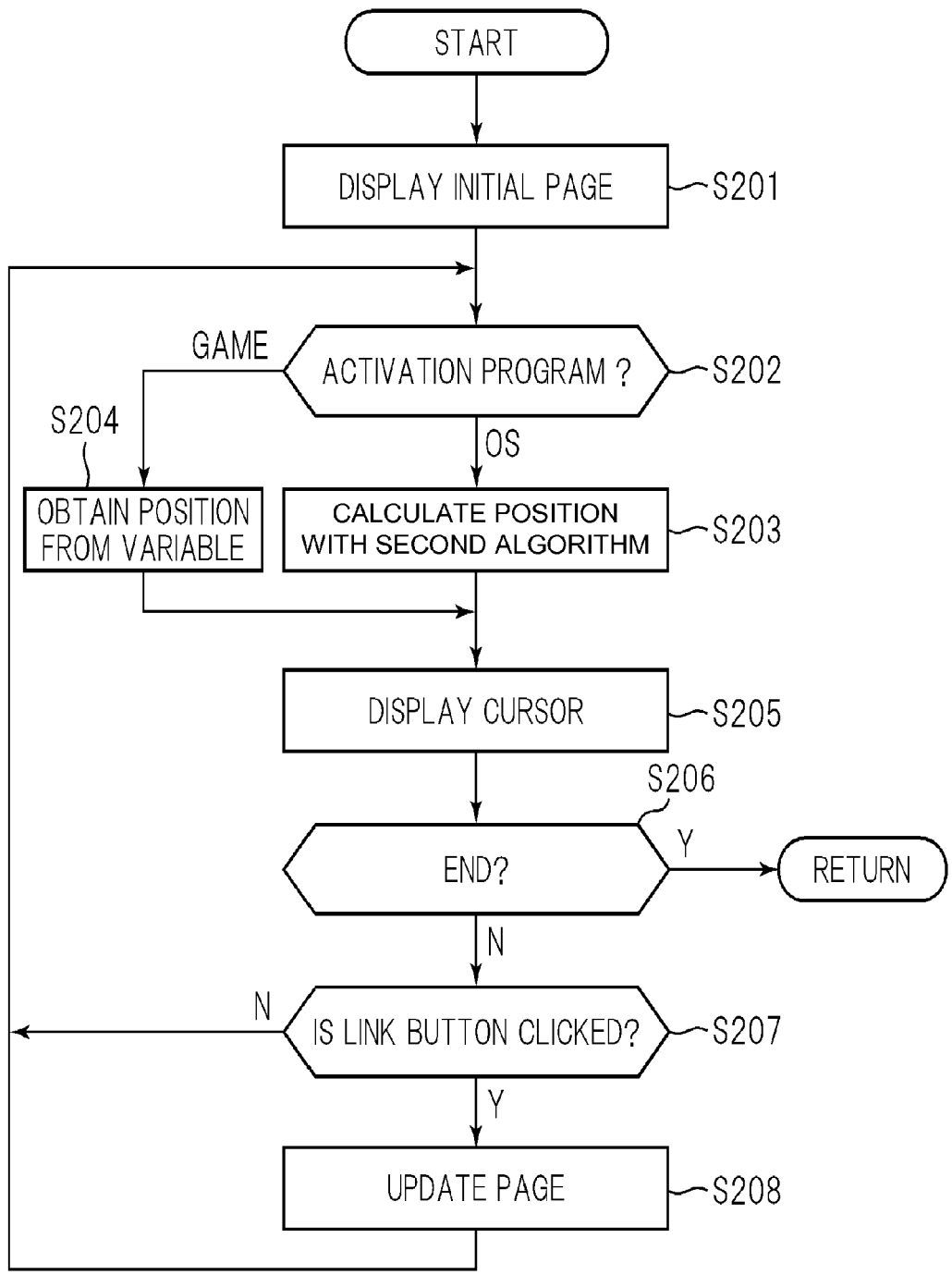

COMPUTER SYSTEM, COMPUTER SYSTEM CONTROL METHOD, PROGRAM, AND INFORMATION STORAGE MEDIUM

BACKGROUND OF THE INVENTION

1. Field of the Invention

The present invention relates to a computer system, a computer system control method, a program, and an information storage medium, and in particular, to improvement of a program that is operated using a pointing device.

2. Description of the Related Art

As an input device of computers, a pointing device has been widely used. In computer game systems, in particular, a new type of pointing device has been also used in which the position thereof is determined using a camera, an infrared signal, a supersonic signal, and so forth, and a display position of a designated position image, such as a cursor image for designating a menu item, an aiming image in a gun-shooting game, and so forth, is determined based on the determined position.

SUMMARY OF THE INVENTION

The applicants have studied to make it possible, while a game application program using such a pointing device is in active, to activate another application program such as a web browser, clock/calendar, music player, and so forth. In the above, the applicants have found a problem such that if behavior of a designated position image in response to an operation of a pointing device should differ between a game application program and another application that is activated by the application program, a user may feel puzzled.

The present invention has been conceived in view of the above, and aims to provide a computer system, a computer system control method, a program, and an information storage medium capable of avoiding a user from sensing change in feeling in operation of a pointing device.

In order to solve the above described problem, according to one aspect of the present invention, there is provided a computer system having a coordinate designation system for producing base data for calculating position coordinates and storing a first application program, a second application program, and an operating system for activating the first and second application programs, wherein the first application program causes the computer system to function as a first position coordinate obtaining unit for obtaining position coordinates that are calculated based on the base data, a first designated position image display unit for showing a designated position image on a display screen based on the position coordinates obtained by the first position coordinate obtaining unit, an activating unit for activating the second application program, and a notifying unit for notifying the second application program activated from the first application program of the position coordinates obtained by the first position coordinate obtaining unit, and the second application program causes the computer system to function as a second position coordinate obtaining unit for obtaining the position coordinates that are calculated based on the base data, and a second designated position image display unit, when the second application program is activated from the first application program, for obtaining the position coordinates notified by the notifying unit, and showing the designated position image on the display screen based on the position coordinates obtained, and when the second application program is activated from the operating system, for showing the designated position image on the display screen based on the position coordinates obtained by the second designated position image display unit.

The base data may include 2D coordinate data indicating a position of the pointing device and posture data describing a posture of the pointing device. The first position coordinate obtaining unit may obtain position coordinates indicating a direction designated by the pointing device based on the base data. The second position coordinate obtaining unit may obtain position coordinates corresponding to a spatial position of a predetermined part of the pointing device, based on the base data.

Further, the second application program may cause the computer to function further as determination unit for determining whether or not the second application program is activated from the first application or from the operation system.

According to another aspect of the present invention, there is provided a method for controlling a computer system having a coordinate designation system for producing base data for calculating position coordinates, comprising the steps of obtaining position coordinates that are calculated based on the base data; when a predetermined application program is activated from another application program, obtaining position coordinates notified by the other application program, and showing a designated position image on a display screen based on the position coordinates obtained; and when the predetermined application program is activated from an operating system, showing the designated position image on the display screen based on the position coordinates obtained at the step of obtaining the position coordinates.

According to another aspect of the present invention, there is provided a program for being executed by a computer system having a coordinate designation system for producing base data for calculating position coordinates, the program for causing the computer system to function as a position coordinate obtaining unit for obtaining the position coordinates that are calculated based on the base data; a designated position image display unit for showing a designated position image on a display screen based on the position coordinates obtained by the position coordinate obtaining unit; an activating unit for activating another program; and a notifying unit for notifying the other program of the position coordinates obtained by the position coordinate obtaining unit.

According to another aspect of the present invention, there is provided a program for being executed by a computer system having a coordinate designation system for producing base data for calculating position coordinates, the program for causing the computer system to function as a position coordinate obtaining unit for obtaining the position coordinates calculated based on the base data; and a designated position image display unit, when the program is activated from a first program that is different from the program, for obtaining position coordinates notified by the first program, and showing a designated position image on a display screen based on the position coordinates obtained, and when the program is activated from a second program that is different from the program, for showing the designated position image on the display screen based on the position coordinates obtained by the position coordinate obtaining unit. Further, there is provided a computer readable information storage medium storing the above described program.

BRIEF DESCRIPTION OF THE DRAWINGS

FIG. 11 is an operational flowchart of a game program; and

FIG. 12 is an operational flowchart of a web browser program.

DETAILED DESCRIPTION OF THE INVENTION

In the following, an embodiment of the present invention will be described in detail with reference to the accompanying drawings.

Figure 1:
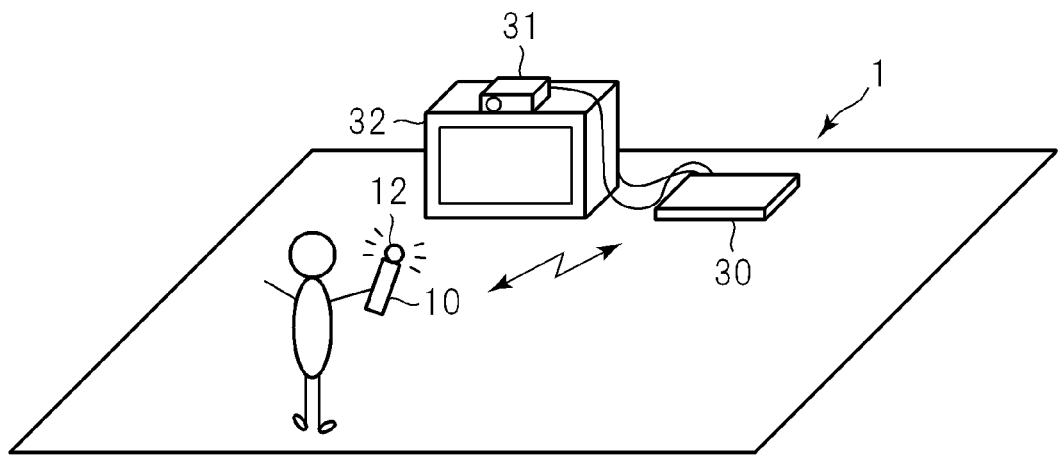
FIG. 1 is a perspective view showing a situation in which a computer game system according to an embodiment of the present invention is used.

FIG. 1 is a perspective view showing a situation in which a computer game system 1 according to an embodiment of the present invention 1 is used. As shown in the diagram, the computer game system 1 comprises a main body 30, a TV set 32, a camera 31, and a pointing device 10. The main body 30 is a computer system formed mainly using an MPU (a microprocessing unit) and connected to the TV set 32, and shows an image and outputs a sound via the TV set 32. The camera 31 is placed on the TV set 32 with the front thereof directed forward and connected to the main body 30. A motion picture of the pointing device 10 obtained using the camera 31 is taken into the main body 30. The pointing device 10 comprises a cylindrical main body and a spherical light emitter 12 attached to a tip end of the main body. A user moves the light emitter 12 to a desired position while holding the main body on his/her hand to thereby designate a position, and directs the axial direction of the main body to a desired position on the screen of the TV set 32 to thereby designate a position.

Figure 2:
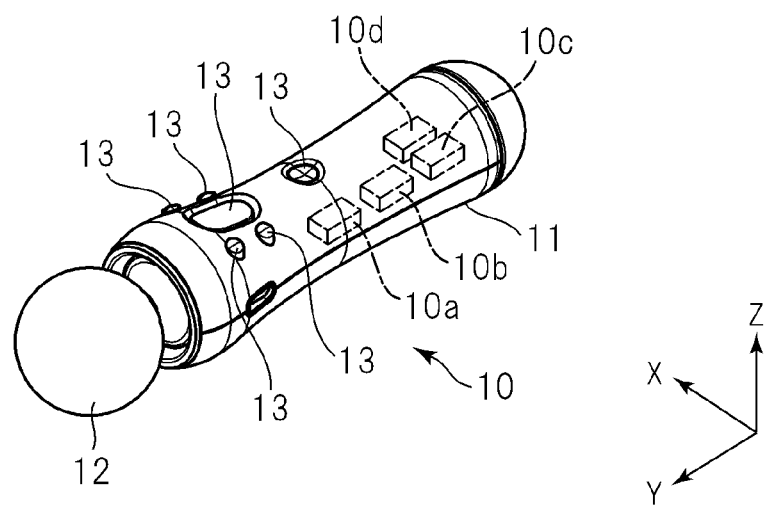
FIG. 2 is a perspective view of a pointing device.

That is, the main body 30 determines the position and diameter of the light emitter 12 shown in a motion picture, and calculates the position (3D coordinates) of the light emitter 12 in the space based on the information obtained. The pointing device 10 incorporates a triaxial gyrosensor 10a, a triaxial acceleration sensor 10b, and a geomagnetism sensor 10c, as shown in FIG. 2, so that rotation and translation directions and azimuth of the pointing device 10 can be obtained. The pointing device 10 additionally has a plurality of buttons 13, and determines whether or not the buttons 13 are pressed. The information is sent by a built-in near field radio communication unit 10d to the main body 30. Based on the information received on the rotation and translation directions and azimuth of the pointing device 10, the main body 30 determines the current posture of the pointing device 10, and when the light emitter 12 is not shown in a motion picture, determines the position of the light emitter 12.

Figure 3:
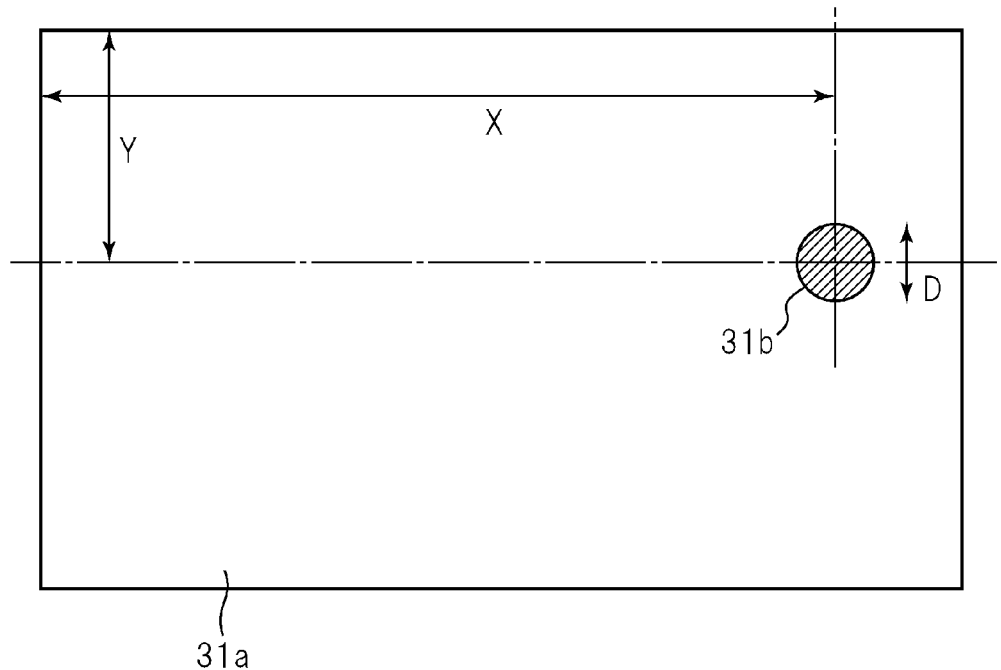
FIG. 3 is a diagram illustrating a method for calculating a designated position of a pointing device.

FIG. 3 is a diagram illustrating a method for determining the position and diameter of the light emitter 12 shown in a motion picture. Specifically, FIG. 3 shows an image 31a in which an emitted light portion 31b of the light emitter 12 is solely shown, which is left after filtering the respective frame images constituting a motion picture obtained using the camera 31. In the main body 30, after production of the image 31a shown in FIG. 3, the diameter D of the area where the light emitter 12 is shown and the coordinates (X, Y) of the center of the area where the light emitter 12 is shown in the entire image 31a are obtained, and the depth (the distance from the camera 31), i.e., the Z coordinate component, of the light emitter 12 in the space is obtained based on the diameter D. Specifically, a larger diameter D is considered as being closer to the camera 31, and a smaller diameter D as being farther from the camera 31. In this manner, a spatial position (X, Y, Z) of the light emitter 12 is obtained.

Figure 4:
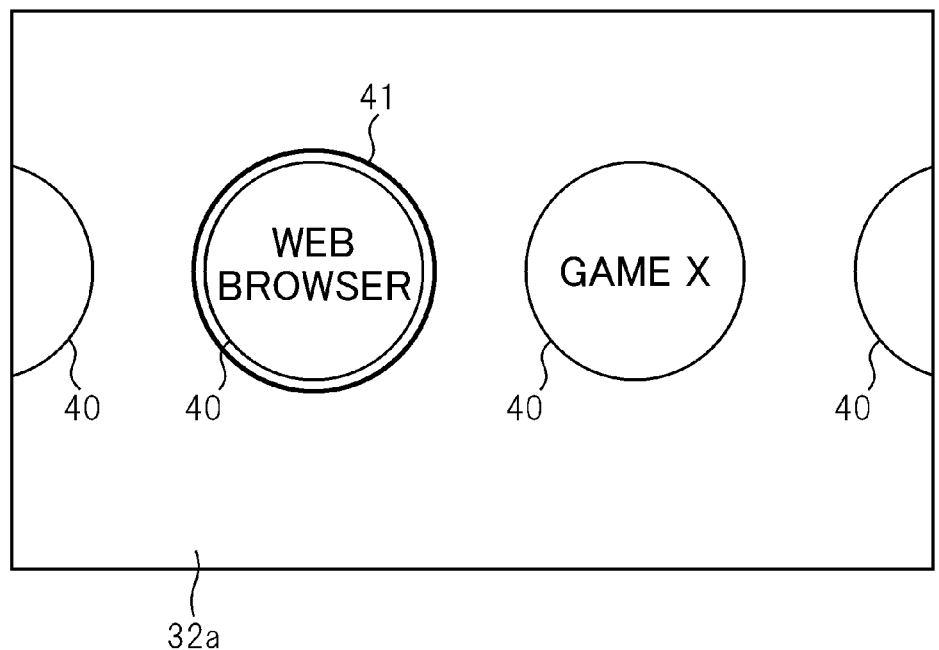
FIG. 4 is a diagram showing a menu screen image of an operating system.

FIG. 4 shows a menu screen image related to an operating system shown on the TV set 32. An operating system is being executed in the main body 30, and a menu screen image is shown on the display screen 32a of the TV set 32 according to the operating system. The menu screen image includes a plurality of icons 40 with a cursor image 41 shown selectively on one of the icons 40. By moving the light emitter 12, the cursor image 41 can be moved to the position of another icon 40. That is, the main body 30 moves the cursor image 41 according to the above described coordinates (X, Y). For example, translation movement of the light emitter 12 to the right in front of the camera 31 causes the cursor image 41 to move to the position of a right icon 40, and translation movement to the left causes the cursor image 41 to move to the position of a left icon 40. When the cursor image 41 is moved to the position of the icon 40 with the text web browser and a specific button 13 of the pointing device 10 is then pressed, an application program of a web-browser can be executed in the main body 30. When the cursor image 41 is moved to the icon 40 with the text game X and a specific button 13 of the pointing device 10 is then pressed, an application program of the game X can be executed in the main body 30.

Figure 5:
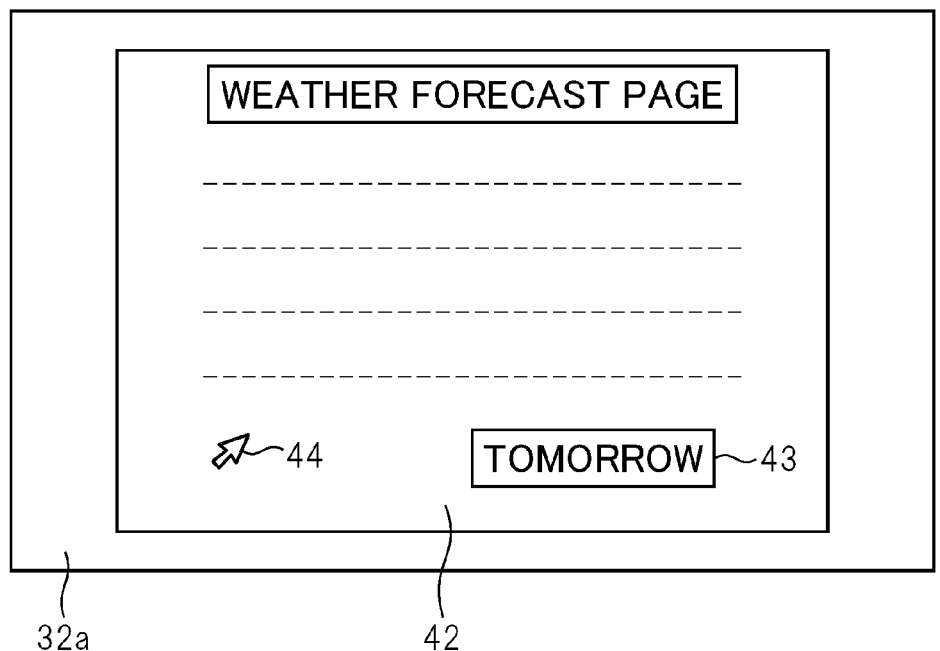
FIG. 5 is a diagram showing a screen image of a web-browser program that is activated by the operating system.

FIG. 5 shows a screen image that is shown on the display screen 32a of the TV set 32 upon activation of a web browser program from the menu screen image shown in FIG. 4. As shown in FIG. 4, the web browser program receives content 42 on the Internet according to an URL input in the URL (uniform resource locator) input form (not shown), and shows the content on the display screen 32a. The display screen 32a includes a button image 43 and the cursor image 44. The cursor image 44 can be moved to a desired position by moving the light emitter 12. That is, the main body 30 moves up, down, leftward, and rightward the cursor image 44 according to the above described coordinates (X, Y). When the cursor image 44 is placed on the button image 43 and a specific button 13 of the pointing device 10 is then pressed, the main body 30 can receive the next content and show on the display screen 32a.

Figure 6:
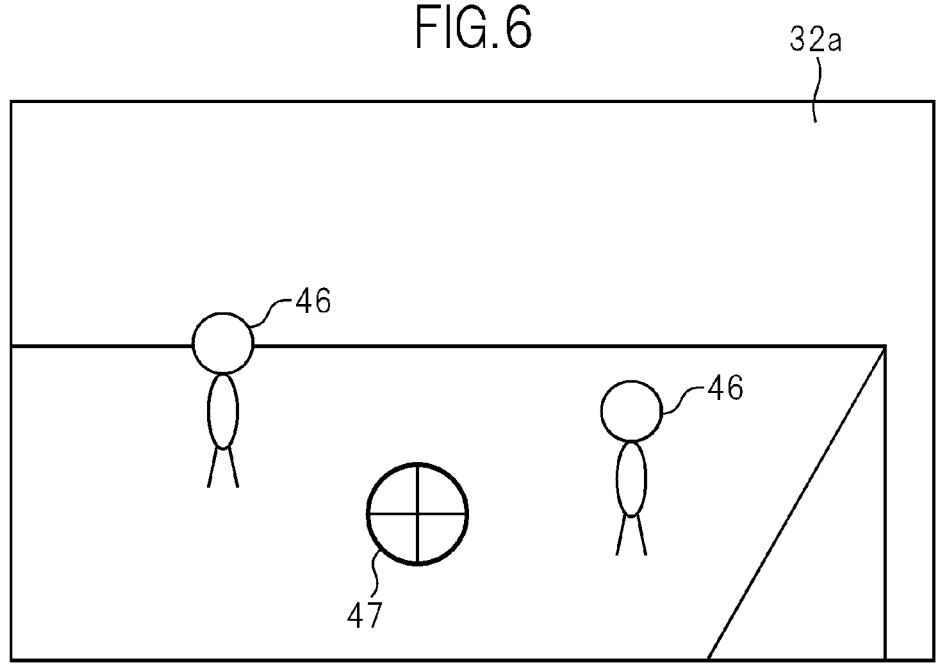
FIG. 6 is a diagram showing a main screen image of a game program.

FIG. 6 shows a main screen image that is shown on the display screen 32a of the TV set 32 upon activation of a game program from the menu screen image shown in FIG. 4. As shown in FIG. 4, the game program relates to a gun shooting game with a plurality of opponent game characters 46 shown on the display screen 32a, as well as an aiming image 47. That is, when the axial direction of the main body of the pointing device 10 is directed to a desired position on the display screen 32a of the TV set 32, an aiming image 47 is shown at the position (a designated on-screen position). The main body 30 determines the current posture of the pointing device 10 based on the rotation and translation directions and azimuth of the pointing device 10 sent from the pointing device 10. In addition, the main body 30 obtains the above described spatial position (X, Y, Z) of the pointing device 10, and based on the information, calculates a point where a straight line extending in the axial direction of the main body of the pointing device 10 intersects the display screen 32a of the TV set 32 and determines the calculated point as a display position (a designated on-screen position) of the aiming image 47. When the aiming image 47 is shown on the display screen 32a and a specific button 13 of the pointing device 10 is then pressed, a bullet is fired.

Figure 7:
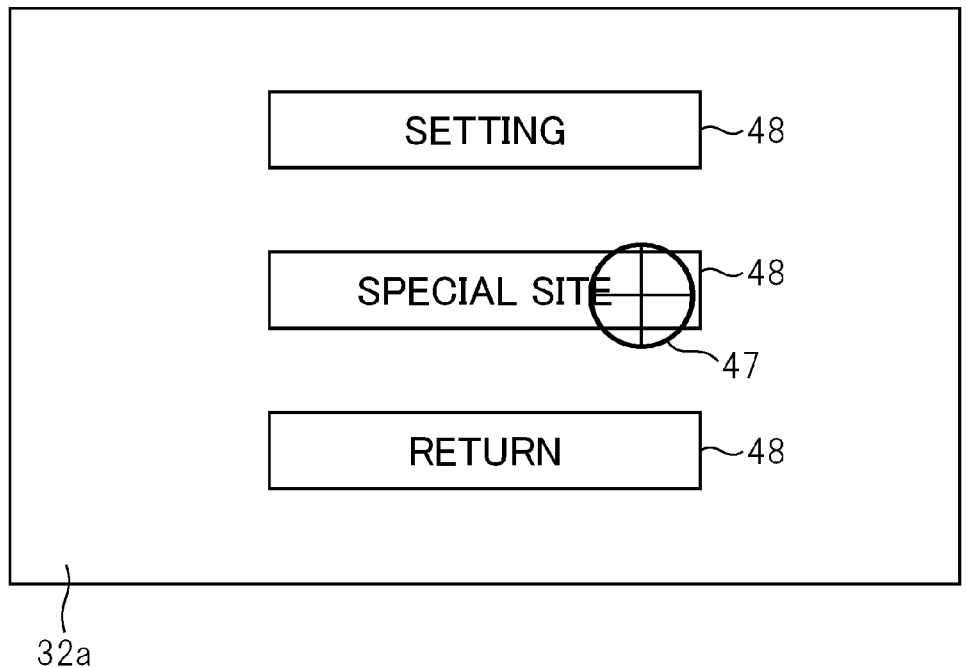
FIG. 7 is a diagram showing a menu screen image of the game program.

FIG. 7 shows a menu screen image of a game program. The menu screen image is shown in response to a specific button 13 of the pointing device 10 pressed during a game. With the menu screen image as well, the aiming image 47 is shown on the display screen 32a. The display position of the aiming image 47 is calculated similar to the main screen image, and the aiming image 47 can be moved to the position of a desired menu item 48 by changing the orientation of the pointing device 10. When the aiming image 47 is placed on the position of a desired menu item 48 and a specific button 13 of the pointing device 10 is then pressed, a process corresponding to the menu item 48 can be executed. Note that one of the menu items 48, that is, one labeled as "special site", is linked to a web browser program here, so that selection of the menu item 48 activates the web browser program as a child process of the game program. In the above, the URL of a company that has developed the game program, for example, is included as an activation parameter.

Figure 8:
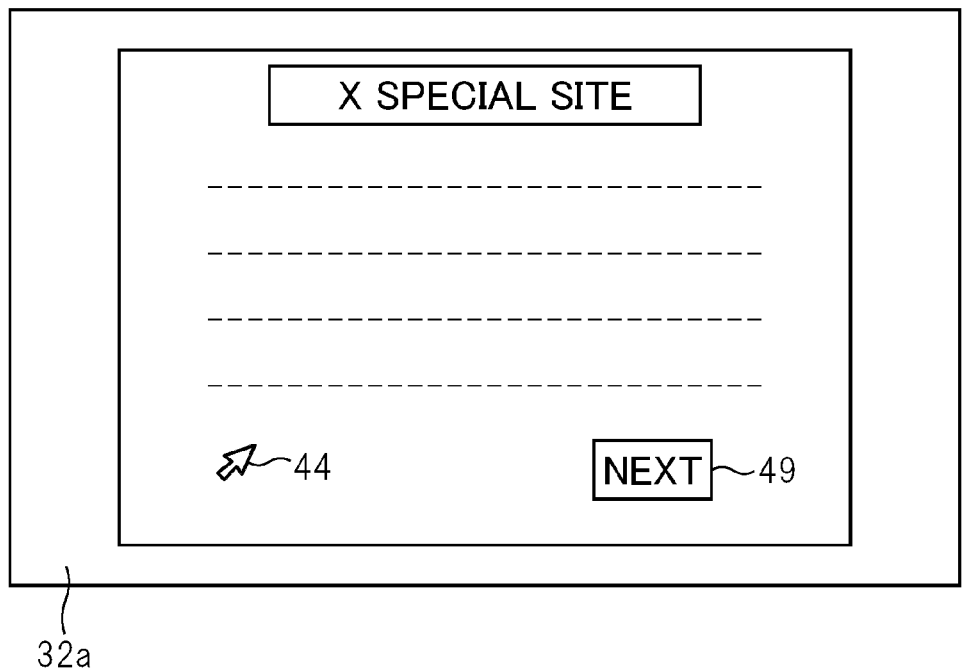
FIG. 8 is a diagram showing a screen image of a web-browser program that is activated by the game program.

FIG. 8 shows a screen image that is shown on the display screen 32a of the TV set 32 upon selection of the menu item 48 labeled as "special site" on the menu screen image shown in FIG. 7. The screen image shown in FIG. 8 is produced by the web browser program that is activated as a child process of the game program, whereas the screen image shown in FIG. 5 is produced by the web browser program that is activated as a parent process directly by the operating system. In the former case, as shown in FIG. 8, the content of the URL designated by the game program as an activation parameter is shown on the display screen 32a. The content includes a button image 49 that is linked to another content. When the cursor image 44 shown on the display screen 32a is moved by the pointing device 10 to be placed on the position of the button image 49 and the specific button 13 is then pressed, the button image 49 can be pressed.

The above is characterized in that the cursor image 44 moves on the display screen 32a according to the position on the display screen 32a designated by the main body of the pointing device 10, similar to the aiming image 47, rather than according to the spatial position (X, Y, Z) of the light emitter 12. This arrangement allows a user enjoying a game program using the pointing device 10 to continue operation of the screen image of the web browser program with the same feeling of operation.

In the following, a process of the computer game system 1 for realizing the above described operation will be described in detail.

Figure 9:
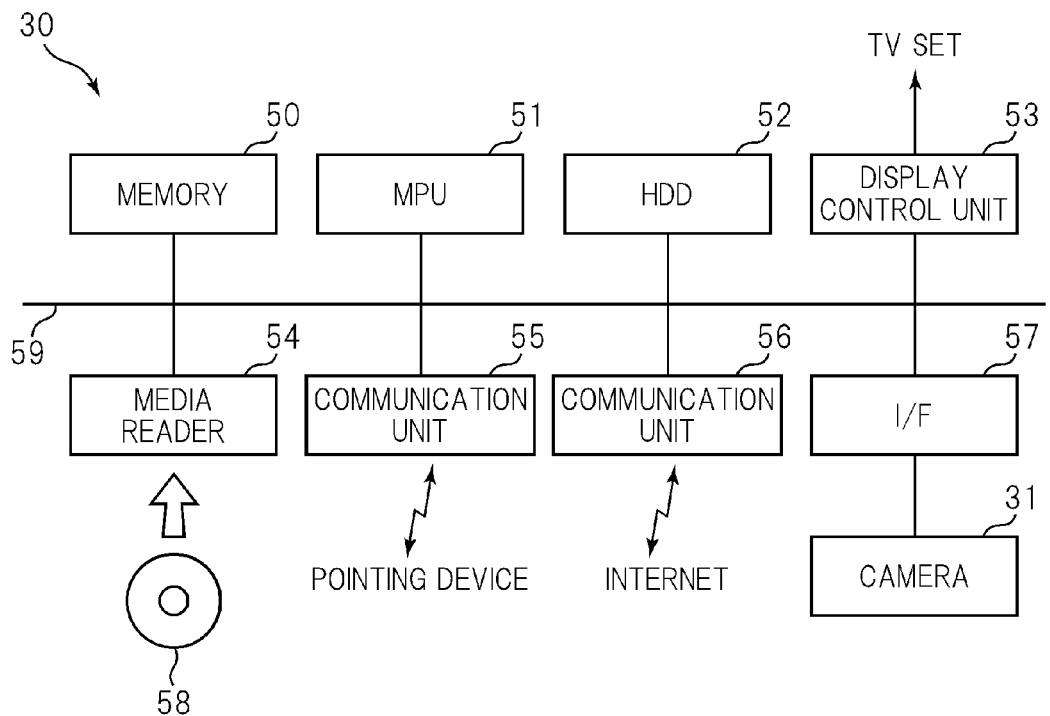
FIG. 9 is a diagram showing a hardware structure of a computer game system.

FIG. 9 is a diagram showing a hardware structure of the main body 30. As shown in the diagram, the main body 30 comprises a memory 50, an MPU 51, a hard disk drive 52, a display control unit 53, a media reader 54, communication units 55, 56, and a peripheral device interface 57, which are all connected to each other via a bus 59 for data communication. The MPU 51 controls the main body 30 and carries out an operation, using the memory 50 as a working memory. The hard disk drive 52 stores various programs and data used by the programs. The display control unit 53 is connected to the TV set 32, and converts display data produced by the MPU 51 into a video signal, and outputs to the TV set 32. The media reader 54 reads data recorded on various magneto-optical disks 58. The communication unit 55 carries out near field radio communication, specifically, data communication with the near field radio communication unit 10d that is built in the pointing device 10 here. The communication unit 56 is connected to a wide area data communication network, such as the Internet, and receives desired data from a computer connected to the network and sends data to the computer. The camera 31 is connected to the peripheral device interface 57 here.

Figure 10:
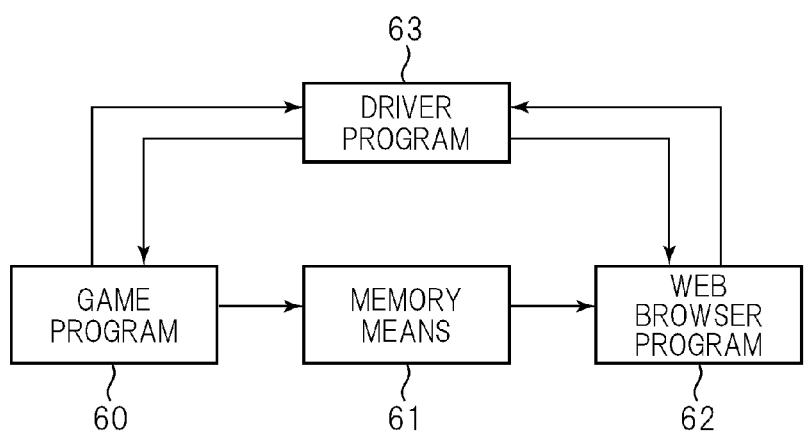
FIG. 10 is a diagram explaining correlation between programs.

As shown in FIG. 10, a game program 60, a web browser program 62, and a driver program 63 are stored, beside an operating system (not shown), in the hard disk drive 52 of the main body 30. These programs may be recorded on the magneto-optical disk 58 to be installed to the hard disk drive 52. Alternatively, these programs may be downloaded by the communication unit 56 from a wide area data communication network.

The driver program 63 includes a program for calculating the coordinates (X, Y, Z) of the above described spatial position based on an image obtained using the camera 31 and a program for calculating a designated on-screen position based on an image captured using the camera 31 and data output from various sensors. The game program 60 activates a web browser as a child process, instructs the driver program 63 to calculate a designated on-screen position, and obtains the calculated designated on-screen position. The obtained designated on-screen position is stored in the memory means 61 comprising a register or the like that is built in the memory 50 or the MPU 51.

The web browser program 62 activated as a child process of the game program 60 reads the designated on-screen position stored in the memory means 61, and shows the cursor image 44 at the position (see FIG. 8). Meanwhile, the web browser program 62 activated directly by the operating system instructs the driver program to calculate a spatial position (X, Y, Z), obtains the coordinates calculated, and shows the cursor image 44 at the obtained coordinates.

That is, according to the computer game system 1, a web browser program obtains the display position of a cursor image using a different method, depending on whether the program is activated by the operating system or another application program. That is, when being activated by an application program other than the operating system, the web browser program 62 shows a cursor image at a position which the application program itself instructs the driver program 63 to calculate. This can avoid abrupt change in feeling of operation.

Note that although the driver program 63 calculates a designated on-screen position and a spatial position in the above, obviously, the game program 60 and web browser program 62 may calculate these based on an image obtained using the camera 31 and data obtained using various sensors of the pointing device 10. For example, a program for calculating designated position coordinates based on an image obtained using the camera 31 and data obtained using various sensors of the pointing device 10 may be recorded on the magneto-optical disk 58 together with the game program 60, so that the game program 60 may cause the program to calculate designated position coordinates. Meanwhile, the web browser program 62 may cause the driver program 63 to calculate designate position coordinates. In this case, the web browser program 62, when being activated by the game program 60, receives the designated position coordinates that are calculated by the program distributed together with the game program 60, and shows a cursor image at the designated position coordinates.

Although the program recorded on the magneto-optical disk 58 together with the game program 60 may differ from the driver program 63 in that designated position coordinates are calculated based on which of the images obtained using the camera 31 and which of the data obtained using the various sensors of the pointing device 10 and using which of the algorithms. However, this embodiment can prevent change in feeling of operation despite such difference.

When the feeling of operation obtained with the web browser program 62 is preferred, the game program 60 may calculate designated position coordinates using a method similar to that of the driver program 63, and store in the memory means 61. Alternatively, the game program 60 may not store designated position coordinates in the memory means 61. In this case, the web browser program 62 may cause the driver program 63 to calculate designated position coordinates so that a cursor image may be shown at the designated position coordinates calculated.

FIG. 11 is a flowchart in a case in which the game program 60 activates the web browser program 62 as a child process. As shown in FIG. 11, the game program 60 calculates the position of the aiming image 47, that is, a designated on-screen position of the pointing device 10, using the driver program 63 (S101), and thereafter, writes the calculated designated on-screen position into the storage means 61 (S102). This process is repetitively carried out until completion of execution of the web browser program 62 (S103).

FIG. 12 is a flowchart of the web browser program 62. According to the web browser program 62, upon activation, the initial page is shown on the display screen 32a (S201). Specifically, when the web browser program 62 is activated by the operating system, a web page at a pre-set URL is shown as an initial page on the display screen 32a. Meanwhile, when the web browser program 62 is activated by the game program 60, a web page at a URL contained in the activation parameter is shown as an initial page on the display screen 32a.

Thereafter, for the activation program being the operating system (S202), a spatial position (X, Y, Z) is calculated by the driver program 63 (S203), and the cursor image 44 is shown at the calculated position (S205). Meanwhile, for the activation program being the game program 60 (S202), the position is read from the storage means 61 (S204), and the cursor image 44 is shown at the position read (S205).

Then, when completion of execution of the web browser program 62 is not instructed by the pointing device 10, whether or not a button image linked to another web page has been selected is determined (S207). When such a button image has not been selected, the process returns to S202. Meanwhile, when such a button has been selected, a new web page is obtained from a URL linked to the selected button image, and shown on the display screen 32a before returning to S202.

According to the above described computer game system 1, when the web browser program 62 is activated by the game program 60 as a child process, the web browser program 62 receives position coordinates from the game program 60 and shows the cursor image 44 at the position coordinates. This can prevent a user from sensing change in feeling of operation of the pointing device 10.

Note that although an embodiment of the present invention is described above referring to an example of a game program and a web browser program, obviously, the present invention can be applied to any other program. Further, the kind of pointing device is not limited to that shown in FIG. 2, and obviously, the present invention can be applied to a pointing device in other formats, such as a device using a camera, an infrared radiation, a supersonic, or the like.

What is claimed is:

1. A computer system, comprising:
a coordinate designation system for producing base data for calculating position coordinates of a user controlled position image;
at least one memory storing a first application program, a second application program, and an operating system for activating the first and second application programs,
at least one processor operating under the control of the first application program to cause the computer system to function as:
a first position coordinate unit operating to calculate position coordinates of the user controlled position image based on the base data in accordance with a first position coordinate computing algorithm yielding a first feeling of operation to the user when the user controlled position image is displayed,
a first designated position image display unit operating to display the user controlled position image on a display screen based on the position coordinates calculated by the first position coordinate unit,
an activating unit operating to permit the first application program to activate the second application program, and
a notifying unit operating to notify the second application program of the position coordinates calculated by the first position coordinate unit when the second application program is activated from the first application program, and
the at least one processor operating under the control of the second application program to cause the computer system to function as:
a second position coordinate unit operating to calculate position coordinates of the user controlled position image based on the base data in accordance with a second position coordinate computing algorithm, which is different from the first position coordinate computing algorithm, yielding a second feeling of operation to the user when the user controlled position image is displayed, and
a second designated position image display unit operating such that: (i) when the second application program is activated from the first application program, the user controlled position image on the display screen is based on the position coordinates received from the notifying unit and calculated based on the base data in accordance with the first position coordinate computing algorithm, and (ii) when the second application program is activated from the operating system, the designated position image on the display screen is based on the position coordinates calculated by the second designated position image display unit based on the base data in accordance with the second position coordinate computing algorithm.

2. The computer system according to claim 1, wherein the base data includes 2D coordinate data indicating a position of a pointing device and posture data describing a posture of the pointing device,
the first position coordinate obtaining unit obtains position coordinates indicating a direction designated by the pointing device based on the base data, and
the second position coordinate obtaining unit obtains position coordinates corresponding to a spatial position of a predetermined part of the pointing device, based on the base data.

3. The computer system according to claim 2, wherein the second application program causes the computer to function as determination unit operating to determine whether or not the second application program is activated from the first application or from the operation system.

4. A method for controlling a computer system having a coordinate designation system for producing base data for calculating position coordinates of a user controlled position image, comprising the steps of:

storing a first application program, a second application program, and an operating system for activating the first and second application programs in a memory of the computer system;

receiving the base data at the computer system;

when the computer system is under the control of the first application program: (i) calculating position coordinates of the user controlled position image based on the base data in accordance with a first position coordinate computing algorithm yielding a first feeling of operation to the user when the user controlled position image is displayed, (ii) displaying the user controlled position image on a display screen based on the position coordinates calculated in accordance with the first position coordinate computing algorithm, (iii) permitting the user to activate the second application program from the first application program, and (iv) notifying the second application program of the position coordinates calculated in accordance with the first position coordinate computing algorithm when the second application program is activated from the first application program; and when the computer system is under the control of the second application program: (i) using the position coordinates received from the notifying step and calculated in accordance with the first position coordinate computing algorithm, and displaying the user controlled position image on the display screen, when the second application program is activated from the first application program; and (ii) calculating position coordinates based on the base data in accordance with a second position coordinate computing algorithm, which is different from the first position coordinate computing algorithm yielding a second feeling of operation to the user when the user controlled position image is displayed, and displaying the user controlled position image on the display screen, when the second application program is activated from the operating system.

5. A non-transient, computer readable storage medium containing a computer program for being executed by a computer system having a coordinate designation system for producing base data for calculating position coordinates of a user controlled position image, the program for causing the computer system to execute actions, comprising:

storing a first application program, a second application program, and an operating system for activating the first and second application programs in a memory of the computer system;

receiving the base data at the computer system;

when the computer system is under the control of the first application program: (i) calculating position coordinates of the user controlled position image based on the base data in accordance with a first position coordinate computing algorithm yielding a first feeling of operation to the user when the user controlled position image is displayed, (ii) displaying the user controlled position image on a display screen based on the position coordinates calculated in accordance with the first position coordinate computing algorithm, (iii) permitting the user to activate the second application program from the first application program, and (iv) notifying the second application program of the position coordinates calculated in accordance with the first position coordinate computing algorithm when the second application program is activated from the first application program; and when the computer system is under the control of the second application program: (i) using the position coordinates received from the notifying step and calculated in accordance with the first position coordinate computing algorithm, and displaying the user controlled position image on the display screen, when the second application program is activated from the first application program; and (ii) calculating position coordinates based on the base data in accordance with a second position coordinate computing algorithm, which is different from the first position coordinate computing algorithm yielding a second feeling of operation to the user when the user controlled position image is displayed, and displaying the user controlled position image on the display screen, when the second application program is activated from the operating system.

\* \* \* \* \*